United States Patent
Weiss (10) Patent No.: US 9,965,856 B2
(45) Date of Patent: May 8, 2018

(54) RANGING CAMERAS USING A COMMON SUBSTRATE

(71) Applicant: Seegrid Corporation, Pittsburgh, PA (US)

(72) Inventor: Mitchell Weiss, Carlise, MA (US)

(73) Assignee: SEEGRID CORPORATION, Pittsburgh, PA (US)

( * ) Notice: Subject to any disclaimer, the term of this patent is extended or adjusted under 35 U.S.C. 154(b) by 438 days.

(21) Appl. No.: 14/196,147

(22) Filed: Mar. 4, 2014

(65) Prior Publication Data

US 2015/0109422 A1    Apr. 23, 2015

Related U.S. Application Data

(60) Provisional application No. 61/894,229, filed on Oct. 22, 2013.

(51) Int. Cl.
| | |
|---|---|
| *H04N 13/02* | (2006.01) |
| *G06T 7/00* | (2017.01) |
| *H04N 5/225* | (2006.01) |

(52) U.S. Cl.
CPC .......... *G06T 7/002* (2013.01); *H04N 5/2253* (2013.01); *H04N 5/2254* (2013.01); *H04N 13/0239* (2013.01); *H04N 2213/001* (2013.01)

(58) Field of Classification Search
CPC ............... G06T 7/002; H04N 13/0239; H04N 2213/001; H04N 13/0242; H04N 5/247; H04N 5/2251; H01L 21/76898; H05K 3/007; H05K 2203/0156
USPC .................................................. 348/48, 340
See application file for complete search history.

(56) References Cited

U.S. PATENT DOCUMENTS

| | | |
|---|---|---|
| D203,597 S | 2/1966 | Newton |
| D217,153 S | 4/1970 | Adkins et al. |
| H650 H | 7/1989 | Lindenmeyer |
| 4,942,529 A | 7/1990 | Avitan et al. |
| D339,149 S | 9/1993 | Nakamura et al. |
| D364,840 S | 12/1995 | Oshizawa et al. |
| 5,614,763 A * | 3/1997 | Womack ............. G02B 6/4212 257/432 |
| 5,687,062 A | 11/1997 | Larson |
| D389,848 S | 1/1998 | James |
| D395,285 S | 6/1998 | Allon |
| 5,938,710 A | 8/1999 | Lanza et al. |
| D416,032 S | 11/1999 | Bakshi |

(Continued)

FOREIGN PATENT DOCUMENTS

| | | |
|---|---|---|
| CN | 102938978 | 2/2013 |
| EP | 2555526 | 2/2013 |

(Continued)

OTHER PUBLICATIONS

Burch, Carol, and Kris Vasoya. "Carbon Composite for Tough PCB Design Specifications." OnBoard Technology, Oct. 2006.

(Continued)

*Primary Examiner* — Nathnael Aynalem (57) ABSTRACT

A stereo camera system useful in, for example, range finding applications. The system is designed for simple manufacture and long term stability. It includes a thermally stable substrate onto which are mounted multiple imagers. The relative positions of the imagers and corresponding optical elements are maintained in precise alignment.

12 Claims, 9 Drawing Sheets

(56) References Cited

U.S. PATENT DOCUMENTS

| | | | |
|---|---|---|---|
| D426,250 S | 6/2000 | Lefkowitz | |
| D445,818 S | 7/2001 | Tucakov | |
| 6,392,688 B1 | 5/2002 | Barman et al. | |
| D508,064 S | 8/2005 | Ramirez | |
| D524,834 S | 7/2006 | Dozier et al. | |
| D529,528 S | 10/2006 | Ross, Jr. et al. | |
| 7,190,389 B1 | 3/2007 | Abe et al. | |
| D541,798 S | 5/2007 | Ichida et al. | |
| 7,277,118 B2 | 10/2007 | Foote | |
| 7,322,833 B1 | 1/2008 | Hakansson et al. | |
| 7,446,766 B2 | 11/2008 | Moravec | |
| D602,931 S | 10/2009 | Kraner et al. | |
| D613,341 S | 4/2010 | Mar et al. | |
| D627,814 S | 11/2010 | Tzeng et al. | |
| D642,607 S | 8/2011 | Bergstrom et al. | |
| 8,081,207 B2 | 12/2011 | Barman et al. | |
| 8,120,645 B2 | 2/2012 | Katahira et al. | |
| 8,274,550 B2 | 9/2012 | Steuart, III | |
| 8,279,266 B2 | 10/2012 | Theobald | |
| 8,283,777 B2 | 10/2012 | Lin et al. | |
| 8,405,820 B2 | 3/2013 | Oouchida | |
| D680,142 S | 4/2013 | Weiss | |
| 8,427,472 B2 | 4/2013 | Moravec | |
| 8,599,301 B2 | 12/2013 | Dowski, Jr. et al. | |
| D697,198 S | 1/2014 | Amirouche et al. | |
| 9,418,193 B2 | 8/2016 | Dowski, Jr. et al. | |
| 9,479,758 B2 | 10/2016 | Woo et al. | |
| 9,635,227 B2 | 4/2017 | Woo et al. | |
| 2004/0073359 A1 | 4/2004 | Ichijo et al. | |
| 2004/0246333 A1 | 12/2004 | Steuart, III | |
| 2005/0030392 A1 | 2/2005 | Lee et al. | |
| 2006/0012673 A1 | 1/2006 | Koselka et al. | |
| 2006/0013580 A1 | 1/2006 | Horiguchi | |
| 2006/0072020 A1 | 4/2006 | McCutchen | |
| 2006/0104800 A1 | 5/2006 | Armbruster | |
| 2006/0132644 A1 | 7/2006 | Shangguan et al. | |
| 2006/0204239 A1* | 9/2006 | Inaba | H04N 13/0029 396/325 |
| 2007/0013779 A1 | 1/2007 | Gin et al. | |
| 2007/0177011 A1 | 8/2007 | Lewin et al. | |
| 2007/0296846 A1* | 12/2007 | Barman | H04N 5/2252 348/340 |
| 2008/0001727 A1 | 1/2008 | Ohsumi et al. | |
| 2008/0084474 A1 | 4/2008 | Bergstrom et al. | |
| 2008/0204570 A1 | 8/2008 | Schultz et al. | |
| 2008/0284041 A1* | 11/2008 | Jang | H01L 21/76898 257/774 |
| 2009/0073308 A1 | 3/2009 | Bleau et al. | |
| 2009/0135247 A1* | 5/2009 | Busse | H04N 13/0239 348/46 |
| 2009/0166063 A1* | 7/2009 | Lai | H05K 3/007 174/254 |
| 2009/0295053 A1 | 12/2009 | Farlow et al. | |
| 2010/0165134 A1* | 7/2010 | Dowski, Jr. | B24B 13/06 348/218.1 |
| 2010/0165155 A1 | 7/2010 | Chang | |
| 2010/0261961 A1* | 10/2010 | Scott | A61B 1/00193 600/111 |
| 2011/0256800 A1 | 10/2011 | Jennings et al. | |
| 2012/0065762 A1 | 3/2012 | Pillarisetti | |
| 2012/0075093 A1 | 3/2012 | Cheng | |
| 2012/0081550 A1* | 4/2012 | Sewell | H04N 5/2251 348/148 |
| 2012/0104420 A1* | 5/2012 | Lee | H01L 27/3276 257/88 |
| 2012/0154521 A1 | 6/2012 | Townsend et al. | |
| 2012/0224844 A1 | 9/2012 | Chen et al. | |
| 2012/0242785 A1 | 9/2012 | Sasagawa et al. | |
| 2013/0044108 A1 | 2/2013 | Tanaka et al. | |
| 2013/0107011 A1 | 5/2013 | Kim et al. | |
| 2016/0350445 A1 | 12/2016 | Dowski, Jr. et al. | |

FOREIGN PATENT DOCUMENTS

| | | |
|---|---|---|
| GB | 2383310 | 6/2003 |
| JP | 06166191 | 6/1994 |
| JP | 2008235629 | 10/2008 |
| KR | 20090012240 | 2/2009 |
| WO | 2013102212 | 7/2013 |

OTHER PUBLICATIONS

International Search Report and Written Opinion dated Jan. 21, 2015 in corresponding International Application No. PCT/US2014/61576.

International Search Report and Written Opinion dated May 14, 2013 in corresponding International Application No. PCT/US2012/072317.

Flexible & integrated unmanned command & control [online]. Howard, Courtney, 2013 [retrieved on May 24, 2014]. Retrieved from the Internet: URL: http://www.militaryaerospace.com/articles/print/volume-24/issue- 11/special-report/flexible-integrated-unmanned-command-control.html>.

Corresponding European Registered Community Design No. 001981242-0001, filed Jan. 26, 2012, Weiss, Mitchell, "Multi-Head Camera," Seegrid Corporation, OHIM—Office for Harmonization in The Internal Market.

Extended European Search Report dated Apr. 24, 2017 issued in corresponding European Application No. 14856698.7.

Korean Office Action dated May 17, 2017 issued in corresponding Korean Application No. 10-2016-7012832.

Rule 70(2) and 70a(2) EPC Communication dated May 19, 2017 issued in corresponding European Application No. 14856698.7.

Korean Final Office Action dated Nov. 13, 2017 issued in corresponding Korean Application No. 10-2016-7012832, with translation.

Standard Multi-layer PCB Stackup by Bittle Electronics Inc., 2012. Circuitree Column, Ritchey, Lee W., Apr. 2009.

* cited by examiner

*FIG. 1*

*(PRIOR ART)*

RANGING CAMERAS USING A COMMON SUBSTRATE

CROSS REFERENCE TO RELATED APPLICATIONS

This application claims the benefit of priority under 35 U.S.C. § 119(e) from U.S. Provisional Application 61/894,229, filed Oct. 22, 2013, entitled RANGING AND RANGE-FINDING SYSTEMS AND METHODS, which is incorporated herein by reference in its entirety.

FIELD OF INTEREST

The present inventive concepts relate to the field of machine vision, and more particularly to the field of determining object range using multiple imagers.

BACKGROUND

A stereo sensor, at a high level, is a sensor that forms a single product, result, or output from inputs simultaneously received from a pair of sensors or detectors. For example, a stereo camera is a pair of cameras that generate a single view of an imaged entity or location from image information received from both cameras. Each camera in a stereo camera has a field of view (FOV), and the fields of view of the two cameras can be combined to give an overall field of view for the stereo camera. In a stereo camera, the fields of view tend to overlap.

The "stereo" nature of a stereo sensor allows for the determination of range information. It can also enable imaging in 3 dimensions, rather than only two dimensions.

Stereo cameras are well known, and have been used in many applications. As examples, stereo cameras have been found to have particular utility in providing three-dimensional (3D) imaging for mapping environments and navigating through them. In such uses, it is not uncommon to use multiple stereo cameras to increase the overall field of view of a system that uses such stereo cameras as an input. For example, U.S. Pat. No. 7,446,766 demonstrates a use of stereo cameras for building evidence grids representing a physical environment and navigating through the environment.

Acquisition of range data can be useful for a number of applications including field measurement, 3-D modeling, navigation and gesture control. There are numerous methods for acquiring range data, including high resolution methods. This concept relates more specifically, but not exclusively, to these high resolution techniques.

Digital imaging technology can be used to capture images of scenes. Comparing images of the scenes taken simultaneously from different vantage points can provide information relating to the range of objects within the scene from the location of the cameras. This technique shall be referred to herein as "stereo ranging." Other techniques for capturing range information include using patterns of light projected onto the scene, which are then processed by a single imager (e.g., as in the Kinect sensor from Microsoft), or measuring the time of flight of reflections of laser beams scanned across the scene (e.g., the Velodyne HDL-64E or Sick LMS 100 scanners). These alternate methods are employed because they provide higher precision than stereo ranging, while employing simpler data processing techniques. This simpler processing requirement is offset by numerous drawbacks. First, the systems employ active, energy emitting devices, such as LEDs or lasers, which means that they require more energy than systems using multiple imagers. It also means that they cannot be used in applications where active radiation is unwanted or unsafe, such as in military reconnaissance. Also, the range of such systems is limited by the strength of the laser or light source, which makes them impractical for portable devices or in large spaces.

The benefits of using stereo image ranging techniques overcome these drawbacks and provide additional benefits. However, until now, it has been impractical to achieve adequate, robust performance because it is necessary to maintain precise knowledge of the relative position of all of the pixels of one imager and its related optics with the pixels of a second imager and its related optics. Previous attempts at designing and implementing stereo imager pairs have employed techniques to mount individual camera systems, including their electronic interfaces to precision manufactured carriers. Manufacturing the stereo system from individual components is costly, and cannot maintain the relative positions of the imagers under all conditions (see, e.g., Point Grey Research, Inc. U.S. Pat. No. 6,392,688).

Figure 1:
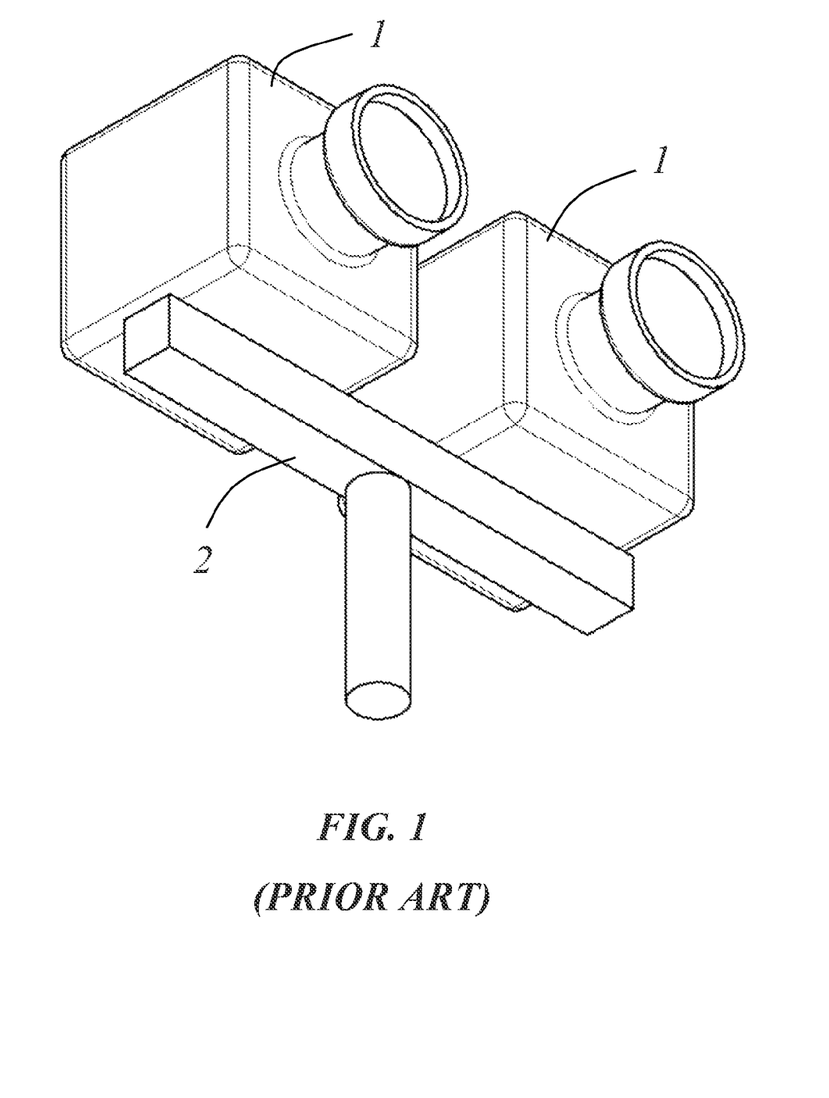
FIG. 1 is a perspective view of a prior art stereo camera comprising two independent camera systems mounted onto a metal carrier.

FIG. 1 is a perspective view of an example of a prior art stereo camera comprising two independent camera systems mounted onto a metal carrier, which serves as a common support. Two cameras 1 are fixedly mounted to a common support 2 using typical camera mounting techniques, e.g., mounting screws. The individual cameras 1 are not designed with high precision location of the imager and lenses with respect to the mounting points. Furthermore, even if metal carrier 2 is formed of a stiff material, the otherwise physical independence of the cameras, manner of mounting such cameras, materials used to form the cameras, and weight of the cameras are all factors that can result in relative motion between the cameras during usage. As such, the positions of the cameras with respect to each other are liable to move due to thermal expansion, vibration, shock, etc. As a result, the cameras require frequent recalibration to achieve precise stereo ranging—particularly where the apparatus is part of a vehicle or other moving platform. Without such calibration, stereo camera performance can be unacceptably degraded.

SUMMARY

In contrast to prior approaches, in accordance with the present inventive concepts, systems and methods are provided that maintain the relative position of the imagers in such a way that practical stereo ranging can be performed.

In accordance with the present invention, provided is a system is provided that can be used for stereo ranging that includes at least two semiconductor imagers mounted on a common circuit board at controlled locations relative to each other.

In various embodiments, the system includes individual lens holders and lenses mounted to the common circuit board.

In various embodiments, the imagers are rectified and calibrated after the two imagers are mounted to the common circuit board.

In various embodiments, the common circuit board is manufactured from typical materials such as fiber reinforced resins.

In various embodiments, the common circuit board is manufactured to achieve high stiffness and thermal stability.

In various embodiments, a stiffening material of the same coefficient of thermal expansion is used in conjunction with the circuit board.

In accordance with another aspect of the invention, provided is a method for mounting at least two imagers to a common substrate and mounting the common substrate to a carrier or container which does not distort the substrate.

The method may include mounting the common substrate using a rail system that allows and/or accommodates length and width expansion of the common substrate.

In accordance with another aspect of the invention, provided is a stereo ranging system, comprising: a common substrate having a flat surface and including a stiffening material having substantially the same coefficient of thermal expansion as other materials in the common substrate; and at least two semiconductor imagers secured to the flat surface of the common substrate and maintained at predefined locations relative to the flat surface.

In various embodiments, the at least two semiconductor imagers can include two cameras, each camera comprising an imager chip and a lens holder that maintains at least one lens relative to the imager chip, wherein each camera is individually secured to the substrate.

In various embodiments, the at least two imagers are at least two wafer scale cameras.

In various embodiments, the substrate can be configured to resist changes in size and shape in a temperature range of about −20° C. to about 50° C.

In various embodiments, the common substrate can be a circuit board.

In various embodiments, the circuit board can be a multilayered printed circuit board.

In various embodiments, the stiffening material can have the same coefficient of thermal expansion as the other layers of the multilayered circuit board.

In various embodiments, the circuit board can be made from fiber reinforced resins.

In various embodiments, the circuit board can have a stiffness of at least three times the stiffness of a similar sized FR4 circuit board.

In various embodiments, the system of claim 1 further comprises a rail system comprising at least one rail, the rail system configured to receive at least two edges of the common substrate and enable expansion in length and width directions while maintaining the common substrate above a mounting structure to which the rail system is configured to secure.

In various embodiments, the rail system can comprise at least two rails, each rail defining a channel that receives the edges of the common substrate.

In various embodiments, the rail system can comprise fasteners configured to secure the at least one rail to the mounting structure.

In various embodiments, the common substrate can include at least one opening configured to receive a pin extending from the mounting service, to assist in maintaining the common substrate within the at least two rails.

In accordance with another aspect of the invention, provided is a stereo camera system, comprising: a common circuit board having a flat surface and including a stiffening material having substantially the same coefficient of thermal expansion as other materials in the common circuit board; and at least two wafer scale semiconductor cameras mounted to the common circuit board at fixed locations relative to each other, wherein the imager chips are individually secured to the common circuit board.

In various embodiments, each wafer scale stereo camera can include an imager chip and a lens holder that maintains at least one lens relative to the imager chip.

In various embodiments, the common circuit board can be configured to resist changes in size and shape in a temperature range of about −20° C. to about 50° C.

In various embodiments, the common circuit board can have a thickness of at least 3 mm.

In various embodiments, the common circuit board can be a multilayer circuit board and the stiffening material can be at least one stiffening layer of the common circuit board.

In various embodiments, the system can further comprise a rail system comprising a plurality of rails, each rail defining a channel configured to receive an edge of the common circuit board and enable expansion in length and width directions while maintaining the common circuit board above a mounting structure to which the rail system is configured to secure.

In accordance with other aspects of the invention, provided is a method of making a semiconductor stereo camera, comprising: providing a common circuit board having a flat surface and including a stiffening material having substantially the same coefficient of thermal expansion as other materials in the common circuit board; and individually mounting at least two semiconductor cameras to the common circuit board at fixed locations relative to each other.

In various embodiments, the method can further comprises mounting the common circuit board to a flat mounting surface using a rail system comprising a plurality of rails, each rail defining a channel configured to receive an edge of the common circuit board and enable expansion in length and width directions while maintaining the common circuit board above a mounting structure to which the rail system is configured to secure.

In various embodiments, method can further comprise rectifying and calibrating the at least two semiconductor cameras after mounting to the common circuit board.

BRIEF DESCRIPTION OF THE DRAWINGS

The present invention will become more apparent in view of the attached drawings and accompanying detailed description. The embodiments depicted therein are provided by way of example, not by way of limitation, wherein like reference numerals refer to the same or similar elements. The drawings are not necessarily to scale, emphasis instead being placed upon illustrating aspects of the invention. In the drawings.

DETAILED DESCRIPTION OF PREFERRED EMBODIMENTS

Hereinafter, aspects of the present invention will be described by explaining illustrative embodiments in accordance therewith, with reference to the attached drawings. While describing these embodiments, detailed descriptions of well-known items, functions, or configurations are typically omitted for conciseness.

It will be understood that, although the terms first, second, etc. are be used herein to describe various elements, these elements should not be limited by these terms. These terms are used to distinguish one element from another, but not to imply a required sequence of elements. For example, a first element can be termed a second element, and, similarly, a second element can be termed a first element, without departing from the scope of the present invention. As used herein, the term "and/or" includes any and all combinations of one or more of the associated listed items.

It will be understood that when an element is referred to as being "on" or "connected" or "coupled" to another element, it can be directly on or connected or coupled to the other element or intervening elements can be present. In contrast, when an element is referred to as being "directly on" or "directly connected" or "directly coupled" to another element, there are no intervening elements present. Other words used to describe the relationship between elements should be interpreted in a like fashion (e.g., "between" versus "directly between," "adjacent" versus "directly adjacent," etc.).

The terminology used herein is for the purpose of describing particular embodiments only and is not intended to be limiting of the invention. As used herein, the singular forms "a," "an" and "the" are intended to include the plural forms as well, unless the context clearly indicates otherwise. It will be further understood that the terms "comprises," "comprising," "includes" and/or "including," when used herein, specify the presence of stated features, steps, operations, elements, and/or components, but do not preclude the presence or addition of one or more other features, steps, operations, elements, components, and/or groups thereof.

Spatially relative terms, such as "beneath," "below," "lower," "above," "upper" and the like may be used to describe an element and/or feature's relationship to another element(s) and/or feature(s) as, for example, illustrated in the figures. It will be understood that the spatially relative terms are intended to encompass different orientations of the device in use and/or operation in addition to the orientation depicted in the figures. For example, if the device in the figures is turned over, elements described as "below" and/or "beneath" other elements or features would then be oriented "above" the other elements or features. The device may be otherwise oriented (e.g., rotated 90 degrees or at other orientations) and the spatially relative descriptors used herein interpreted accordingly.

Figure 2A:
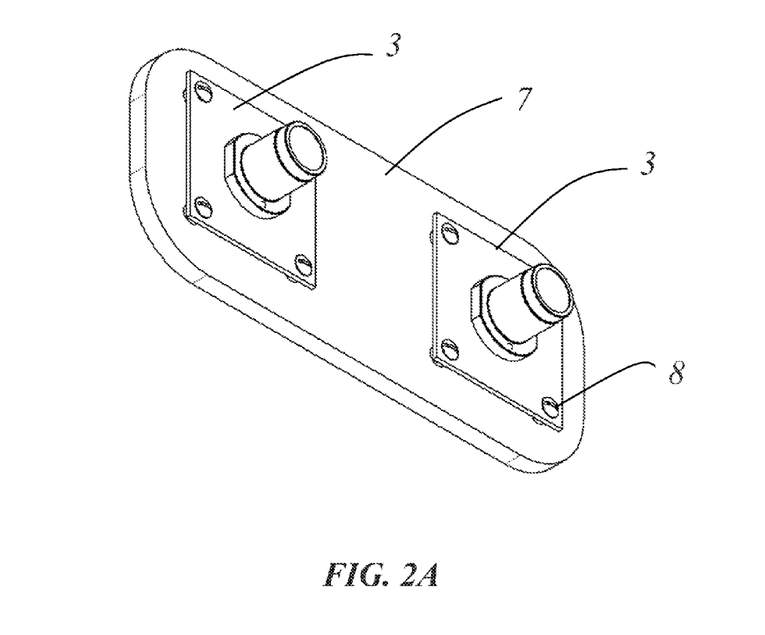
FIG. 2A is a perspective view of two circuit board style cameras mounted to a common carrier at the backside of the cameras, in accordance with aspects of the inventive concept.

FIG. 2A is a perspective view of two circuit board style cameras mounted to a common carrier at the backside of the cameras, in accordance with aspects of the inventive concept. And FIG. 2B is a perspective view of one of the cameras of FIG. 2A and FIG. 2C is a cross-sectional view of the camera of FIG. 2B.

Figure 2B:
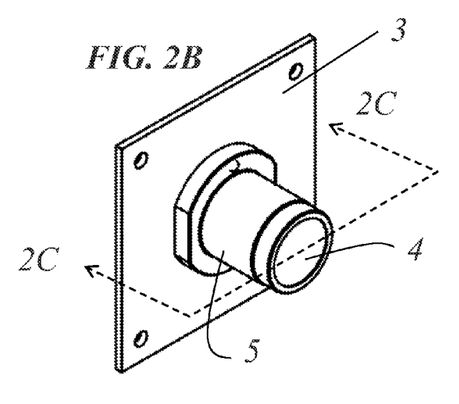
FIG. 2B is a perspective view of one of the cameras of FIG. 2A
Figure 2C:
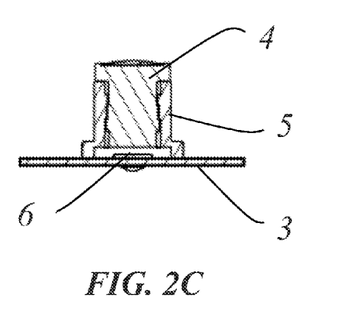
FIG. 2C is a cross-sectional view of the camera of FIG. 2B.

Referring to the embodiment of FIGS. 2A through 2C, a camera is comprised of a circuit board 3, to which is fixed an imager chip 6, as well as a lens holder 5. A barrel mounted lens 4 is inserted into the lens holder 5. Lens 4 may be maintained and/or secured within lens holder 5 by any number of manners, e.g., a glue or other adhesive. Each imager chip 6 can be electrically connected to its respective circuit board 3. An example of such an imager chip is the COP-USA Inc. Part number BB13LA.

To form a stereo camera, two such cameras are mounted to a rigid substrate 7 which can be fabricated from metal, such as aluminum. Here, the rigid substrate 7 is shown as a flat elongate rigid board, but in other embodiments it could take a different shape. In this embodiment, the flat circuit board 3 of each camera is mounted to a flat face of the rigid substrate. The cameras can be secured to the rigid substrate 7 using a variety of types of securing mechanisms, e.g., adhesives and/or fasteners 8. In addition to being rigid, substrate 7 should also have a high degree of thermal stability, which is the ability of a material to resist changes in physical shape or size as its temperature changes. Preferably, the substrate 7 has the ability to resist changes in size and shape in a temperature range of about −20° C. to about 50° C.

When compared to the arrangement of FIG. 1, the arrangement of FIGS. 2A through 2C is less susceptible to shock and vibration effects (e.g., deflection) because the cameras are lower mass than in the example of FIG. 1. However, the relative positions of the imagers and lenses can be difficult to maintain because of the number of parts involved in the assembly, and in the precision of the mounting arrangements.

Figure 3A:
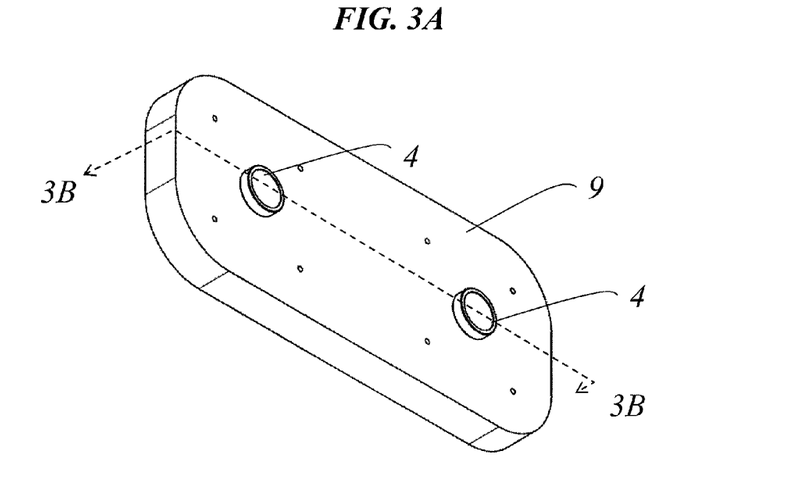
FIG. 3A is a perspective view of an embodiment of a reference plate into which have been mounted two cameras via a backside of a reference plate and FIG. 3B is a cross-sectional view of the reference plate and cameras of FIG. 3A, in accordance with aspects of the inventive concept.
Figure 3B:
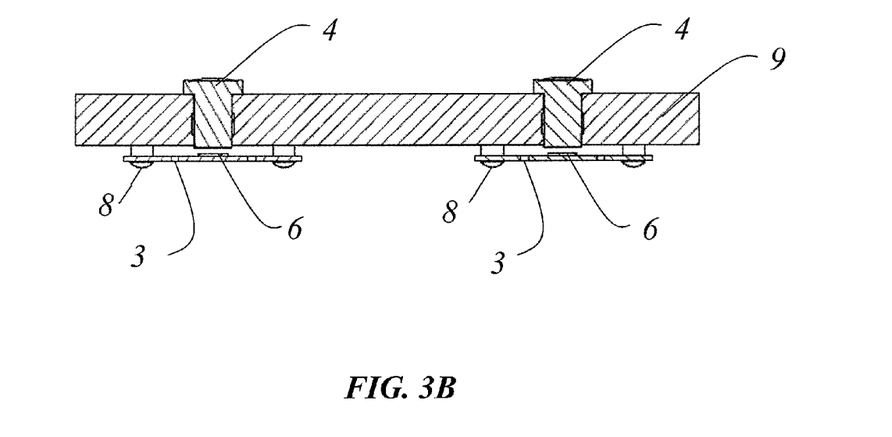

FIG. 3A is a perspective view of an embodiment of a reference plate into which have been mounted two cameras via a backside of a reference plate and FIG. 3B is a cross-sectional view of the reference plate and cameras of FIG. 3A, in accordance with aspects of the inventive concept.

According to FIGS. 3A and 3B, a lens holder and carrier 9 are fabricated from a single precision machined part. This provides the benefit of maintaining alignment of the lenses 4, but still allows the circuit boards 3 carrying the imagers 6 to move with respect to each other. Here, the circuit boards 3 are attached to the carrier using four screws, but other securing mechanisms could be used in other embodiments.

However, it can also be expensive to fabricate the system, making it undesirable for high volume applications.

An improved stereo ranging camera, and method of manufacturing same, fixes the imager chips directly to a common circuit board, and then mounts the lenses and lens holders to the same circuit board substrate.

Figures 4A, 4B:
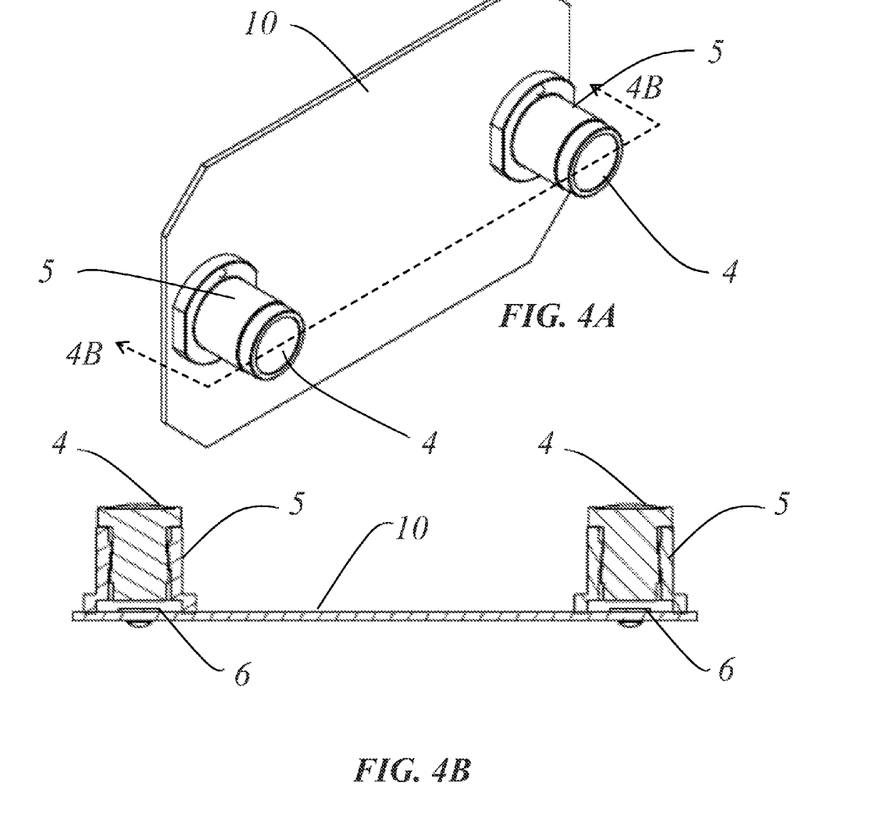
FIG. 4A is a perspective view of an embodiment of a stereo camera system comprising independent optical elements mounted to a single circuit board and FIG. 4B is a cross-sectional view of the stereo camera system of FIG. 4A, in accordance with aspects of the inventive concept.

FIG. 4A is a perspective view of an embodiment of a stereo camera system comprising independent optical elements mounted to a single circuit board and FIG. 4B is a cross-sectional view of the stereo camera system of FIG. 4A, in accordance with aspects of the inventive concept.

In this embodiment, a stereo ranging camera is made by affixing (or securing) the imager chips 6 directly to a common circuit board 10, and then mounting the lens and lens holders 4 and 5 to same circuit board substrate 10. Here, an imager chip 6, lens holder 5, and lens 4 combine to comprise a camera.

Figure 5A:
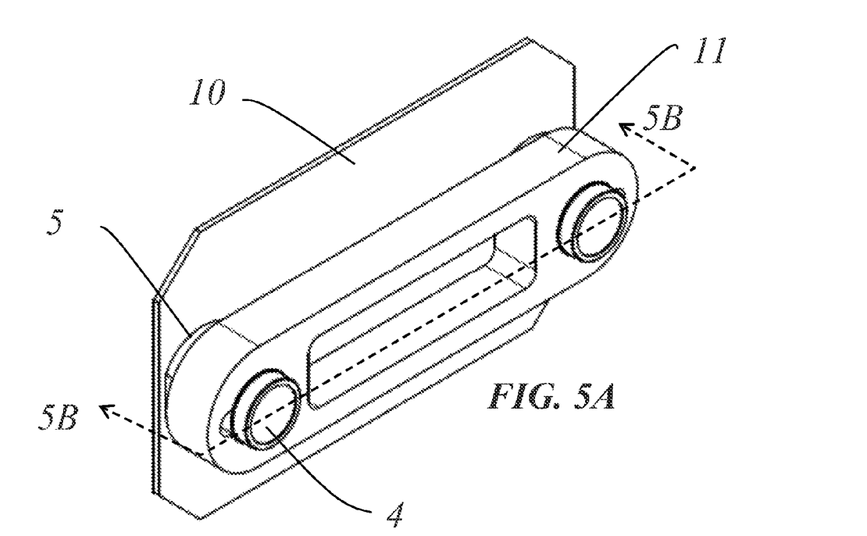
FIG. 5A is a perspective view of the stereo camera system of FIGS. 4A and 4B with a stiffener added to the lens holders to reduce flexibility and FIG. 5B shows a cross-sectional view of the stereo camera system of FIG. 5A, in accordance with aspects of the inventive concept.
Figure 5B:
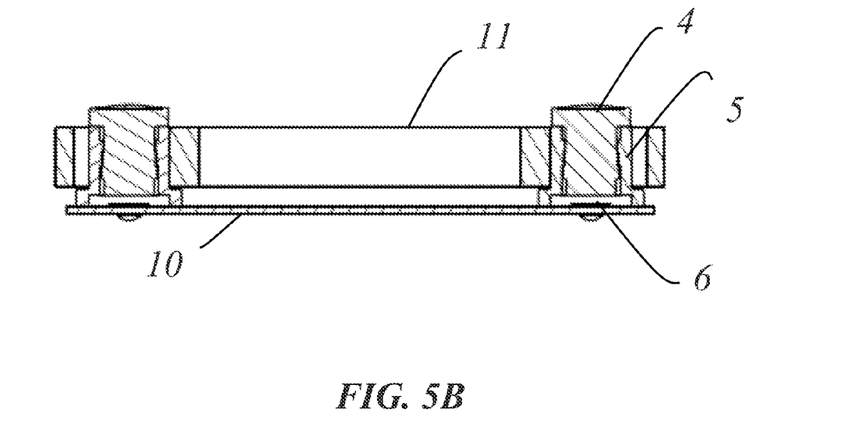

Circuit boards, such as circuit board 10, are relatively stable and the relative position of the imager chips 6 can be maintained with this approach. However, the board 10 itself can be easy to flex and bend, and can be deformed when mounting to the structure on which the stereo camera is intended to be used. In order to overcome this, a stiffener 11 can be added to the assembly as shown in FIGS. 5A and 5B. In this embodiment, the stiffener 11 is preferably fabricated from the same material as the board 10, so that there is no relative expansion, contraction or other deformation due to thermal expansion, and is rigidly fixed to the lens holders 5, e.g., clamped and/or other securing mechanisms. The stiffener 11 can be fabricated with two defined openings corresponding to, and configured to receive, the lens holders 5 from the two cameras. Preferably, the two defined openings are sized to make a tight fit with the lens holders 5 to mitigate any potential for relative movement of the lens holders (and lenses therein) within such openings. This arrangement has been shown to provide adequate performance over time, but can be expensive to produce.

Figure 6A:
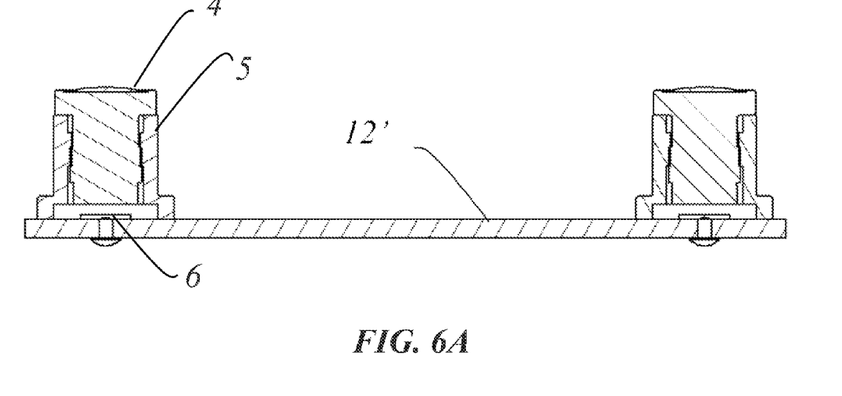
FIG. 6A is a cross-sectional view of a stereo camera system with a common substrate and separate lens components where the substrate is a thicker form of circuit board, in accordance with aspects of the inventive concept.

FIG. 6A is a cross-sectional view of a stereo camera system with a common substrate and separate lens components, where the substrate is a thicker form of circuit board, in accordance with aspects of the inventive concept. Commonly circuit boards, such as circuit board 10, are fabricated to have a thickness below 1/16". An alternative option to improve stiffness by adding the stiffener 11 from FIGS. 5A and 5B is to fabricate the circuit board 10 from a thicker material, e.g., up to 1/8" thick, as shown by board 12' in FIG. 6A. Doubling the board thickness, in this example, increases the stiffness by a factor of 8 (i.e., a cubic function of the thickness).

Figure 6B:
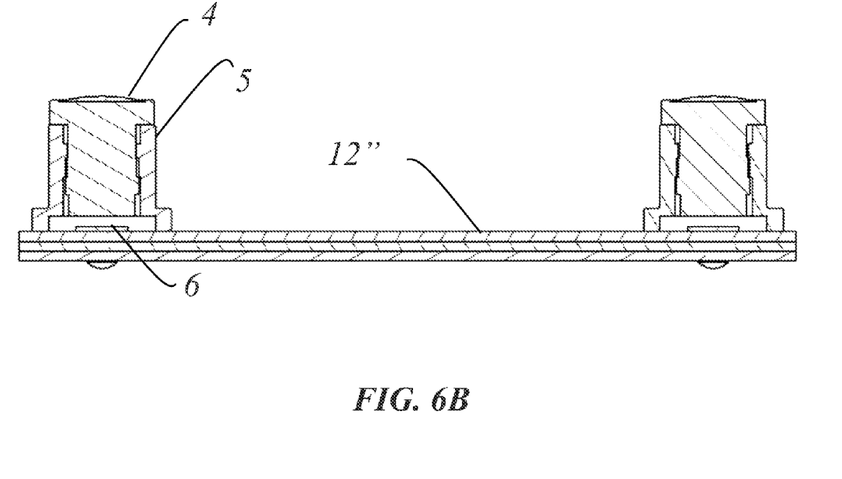
FIG. 6B is a cross-sectional view of a stereo camera system similar to FIG. 6A, but where a thick, multilayered circuit board having a higher stiffness than a circuit board made of standard materials is used, in accordance with aspects of the inventive concept.

FIG. 6B is a cross-sectional view of a stereo camera system similar to FIG. 6A, but where a thick, multilayered circuit board having a higher stiffness than a circuit board made of standard materials is used, in accordance with aspects of the inventive concept. In this embodiment, circuit board 12" is a laminated board, where some of the lamination layers can be of a higher strength material, such as carbon fiber, providing even increased stiffness.

In this embodiment, the individual circuit board layers can be each fabricated to have a thickness below 1/16" as in FIGS. 5A and 5B. However, in some embodiments, the individual circuit board layers can be thicker, e.g., about 1/8" thick. In some embodiments, the multilayered circuit board 12" can have layers with different thicknesses, e.g., some about 1/16" thick and others about 1/8" thick.

While not shown in FIGS. 6A and 6B, in various embodiments, stiffener 11 could also be used with the stereo cameras and circuit boards 12' and 12" to provide additional stiffness. In such embodiments, the stereo camera system includes a plurality of different types of stiffening mechanisms.

By manufacturing a stiffer board, as with multilayered boards 12' and 12", the stability in maintaining the relative positions of the imagers and lenses is improved. The increased stiffness of the board prevents bending, which contributes to aim, or convergence and divergence, errors in the lens alignments and provides improved performance for stereo ranging over time.

Figure 7A:
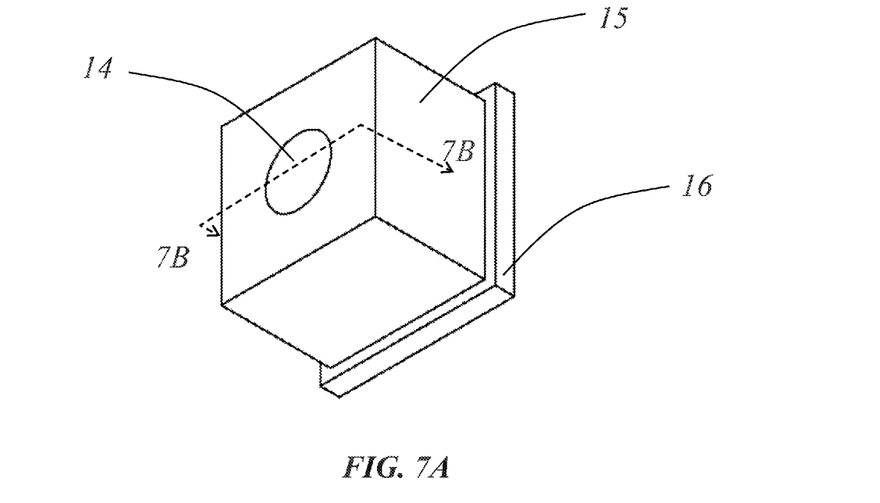
FIG. 7A is a perspective view of an imager chip with an integrated lens system and FIG. 7B shows a cross-sectional view of the stereo camera system of FIG. 7A, in accordance with aspects of the inventive concept.
Figure 7B:
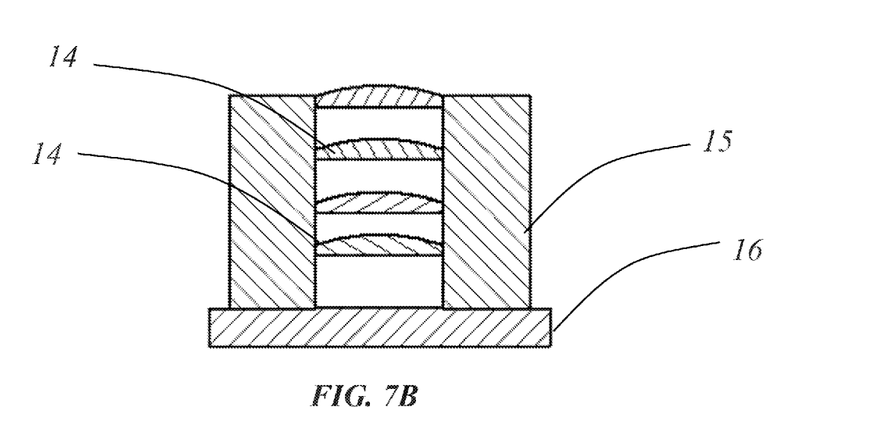

FIG. 7A is a perspective view of an imager chip with an integrated lens system and FIG. 7B shows a cross-sectional view of the stereo camera system of FIG. 7A, in accordance with aspects of the inventive concept.

As camera applications have increased in mobile and portable devices, such as cellular telephones, a new class of camera devices called, "Wafer Scale Cameras" has emerged. Wafer scale cameras, as shown in FIGS. 7A and 7B bond a lens holder assembly 15 with the lenses 14 (4 lenses shown) directly to the imager chip 16. Because of its integrated and rigid structure, there is no opportunity for the lenses 14 to move with respect to the imager chip 16 after fabrication.

Figure 8A:
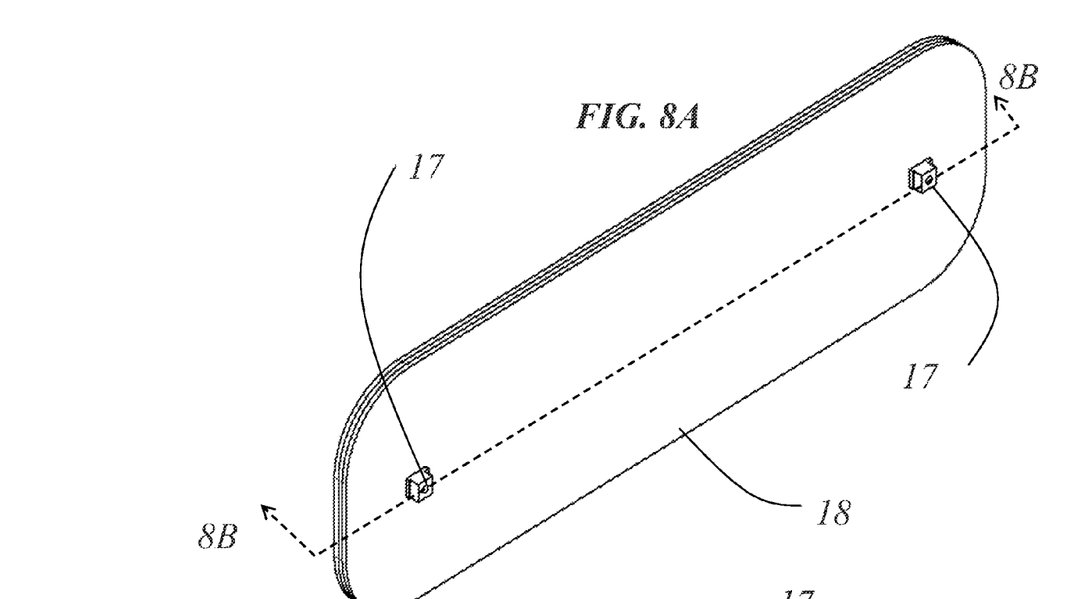
FIG. 8A is a perspective view of a stereo camera system made comprising a stiff substrate to which are mounted two integrated lens/imager units, the substrate including a thick, multilayered circuit board having higher stiffness than the standard circuit board materials
Figure 8B:
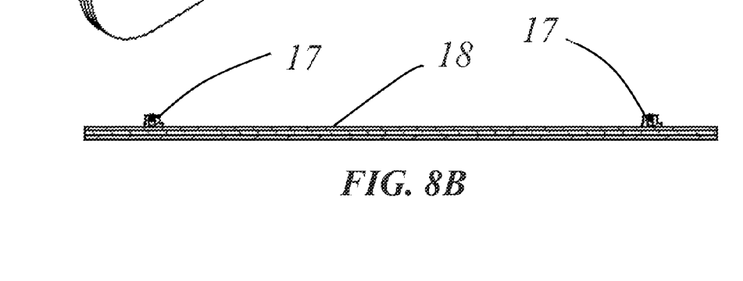
FIG. 8B shows a cross-sectional view of the stereo camera system of FIG. 8A, in accordance with aspects of the inventive concept.

FIG. 8A is a perspective view of a stereo camera system made comprising a stiff substrate to which are mounted two integrated lens/imager units, the substrate including a thick, multilayered circuit board having a greater degree of stiffness than a standard circuit board, e.g., the multilayer circuit board can include at least one stiffening layer or material adhered to at least one standard circuit board made from typical circuit board materials. Therefore, the at least one stiffening layer can have greater stiffness than a standard circuit board layer to which it is adhered. In some embodiments, one or more standard circuit board layers can be coated with a stiffening material, e.g., a hard resin or plastic. FIG. 8B shows a cross-sectional view of the stereo camera system of FIG. 8A, in accordance with aspects of the inventive concept.

FIGS. 8A and 8B shows two wafer scale cameras 17 mounted directly to a rigid circuit board 18, as discussed above. This provides all of the benefits of the improved camera in FIGS. 6A and 6B with reduced costs of implementing the lens and holder precision. Additionally, the extremely low mass of the wafer scale cameras 17 results in lower forces being applied to the circuit board 18 due to vibration and shock loading, further improving performance. In this embodiment, circuit board 18 is a multilayered circuit board, e.g., as shown and described with respect to FIG. 6B.

In the embodiment of FIGS. 8A and 8B, the cameras are secured to the circuit board 18, e.g., by an adhesive, bonding, or other approaches. In this embodiment, the cameras are secured by soldering them to the circuit board. In other embodiments, the cameras 17 could be countersunk into the circuit board, e.g., attached to a middle layer or bottom layer, and not secured to a top surface layer as shown. In this embodiment, the thickness of circuit board 18 is preferably at least 3 mm, but this is not an essential requirement of the invention. The cameras are separated by about 10 cm, but this is also not an essential requirement of the invention. The rigid circuit board is fabricated to be at least 3 times stiffer than a normal 1/16" thick FR4 circuit board of the same size (length and width), in this embodiment.

All of the previous stereo ranging camera examples require the cameras to be calibrated. This involves aiming the camera at a calibration target, or set of targets, and determining the exact, e.g., within about ½ pixel preferably, relative positions of the imagers in the camera system. This calibration data can be used as long as the camera is not distorted or modified. The solutions of mounting the cameras and imagers to a common substrate are improved by making the substrate stiffer (e.g., thicker) than normally used in other applications. However, this might not adequately compensate for the very high forces which can be applied to the substrate if it is mounted to a warped or distorted surface. One possible solution for this is illustrated in FIGS. 9A and 9B.

Figure 9A:
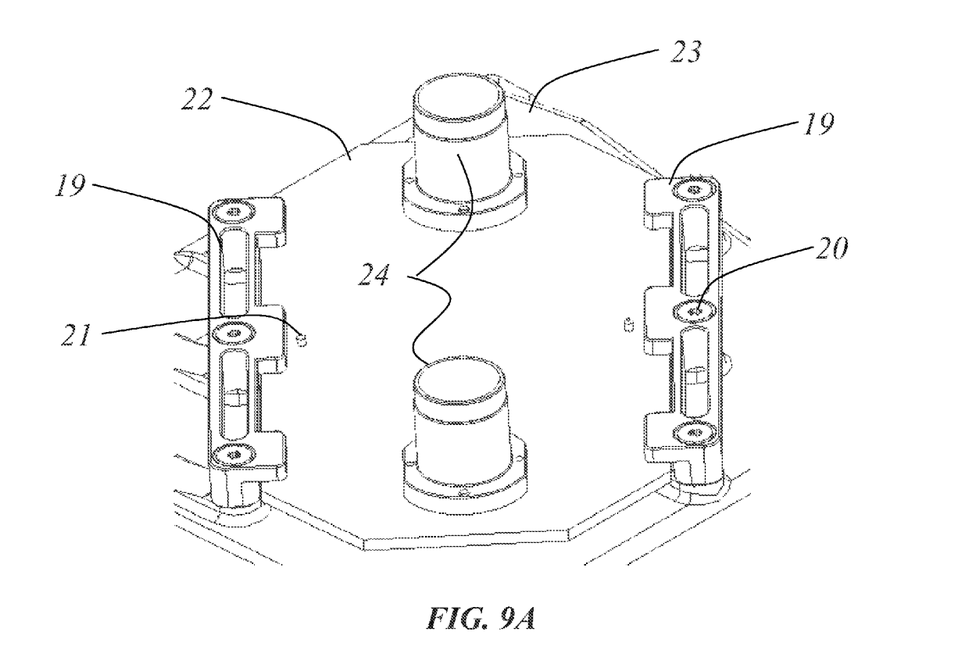
FIG. 9A is a perspective view of a stereo camera system for mounting the cameras to a substrate without deforming the substrate and FIG. 9B is a perspective view of a stiffener used in the embodiment of FIG. 9A, in accordance with aspects of the inventive concept.
Figure 9B:
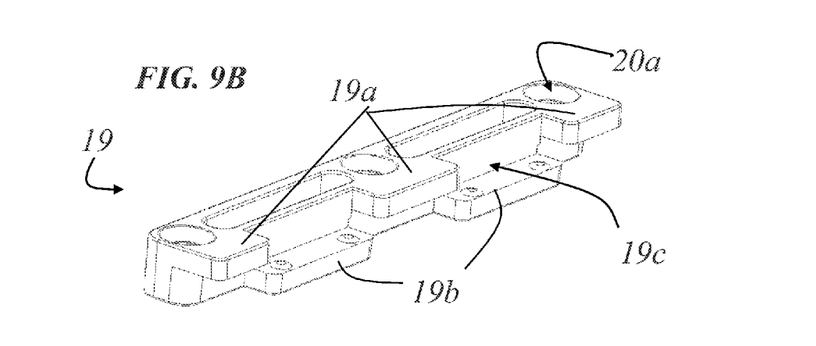

FIG. 9A is a perspective view of a stereo camera system for mounting a pair of cameras to a substrate without deforming the substrate and FIG. 9B is a perspective view of a rail used in the embodiment of FIG. 9A, in accordance with aspects of the inventive concept. In various embodiments, one or more rails can be used to position and capture the circuit board or other substrate to which are mounted stereo cameras, without applying any bending forces to the substrate.

Referring to FIGS. 9A and 9B, a rail 19 can be manufactured from a stiff and/or rigid metal, plastic, resin, fiberglass, composite or other material and used to position the board 22 and reduce the potential for deflection in the board which would be caused by mounting it with screws or similar fasteners which apply concentrated pressure to small areas on the substrate. In various embodiments, for example, rail 19 can be molded from plastic, machined from aluminum, or otherwise formed.

In this embodiment, a camera assembly includes two cameras 24 mounted to a substrate 22. Here, two rails 19 are used and each rail 19 fits around the peripheral edges of the camera assembly substrate 22 allowing clearance for motion and expansion in the longer directions (length and width) of the substrate while fitting snugly around the thickness (height). The rails 19 are fixed to a precisely machined mounting structure 23 using fasteners 20, where the surface of structure 23 is machined or finished to be flat. To accommodate fasteners 20, fastener holes 20a may be formed in rail 19, as shown in FIG. 9B.

As is also shown in FIG. 9B, a rail 19 can have one or more top lips 19a and one or more bottom lips 19b that combine to form a channel 19c configured to receive an edge of substrate 22. Accordingly, as is shown in FIG. 9A, in the embodiment rails 19 are also mounted to peripheral edges of the substrate 22. Pins 21, which can slip fit through holes in the substrate, but are mounted fixedly in the mounting structure 23 below substrate 22, are used to prevent the camera assembly substrate 22 from sliding out of the rails 19.

Here, the rails 19 maintain the assembly substrate 22 with cameras 24, above the mounting structure 23. This arrangement applies no bending moments because the mounting structure surfaces are finished flat to the camera assembly substrate 22, and the camera is free to expand or contract differentially with respect to surface 23, preventing any possible distorting forces from being applied to the substrate due to differential thermal expansion of either the substrate 22 or the mounting structure 23.

The improvements described above include mounting the components to a common substrate, ensuring the substrate is preferably at least three times stiffer than a typical circuit board, and mounting the substrate in such a way as to prevent distorting forces.

While note shown, when the common substrate is a printed circuit board, the cameras can electrically communicate received or detected image information with an image processor via conductive traces formed in the printed circuit board and or wires, vias, bumps, etc. If the common substrate is not a circuit board with traces, then the stereo imagers can communicate with the image processors via wires or other transmission mediums. In some embodiments, a wireless transmitter could be mounted to the common substrate or be otherwise connected to the cameras and wirelessly transmit image information to an image processor or other system.

While the description of preferred references stereo cameras, those skilled in the art will readily appreciate that the stiff common substrate could be advantageous for other types of stereo sensors.

While the foregoing has described what are considered to be the best mode and/or other preferred embodiments, it is understood that various modifications can be made therein and that the invention or inventions may be implemented in various forms and embodiments, and that they may be applied in numerous applications, only some of which have been described herein. It is intended by the following claims to claim that which is literally described and all equivalents thereto, including all modifications and variations that fall within the scope of each claim.

What is claimed is:

1. A stereo ranging system, comprising:
    a common substrate comprising a printed circuit board having a thickness of at least $\frac{1}{8}$";
    at least two semiconductor imagers secured to a flat surface of the common substrate and maintained at predefined locations relative to the flat surface; and
    a rail system comprising at least one rail, the rail system configured to receive at least two edges of the common substrate and enable expansion in length and width directions while maintaining the common substrate above a mounting structure to which the rail system is configured to secure.

2. The system of claim 1, wherein the at least two semiconductor imagers includes two cameras, each camera comprising an imager chip and a lens holder that maintains at least one lens relative to the imager chip, wherein each camera is individually secured to the substrate.

3. The system of claim 1, wherein the at least two semiconductor imagers are at least two wafer scale cameras.

4. The system of claim 1, wherein the substrate is configured to resist changes in size and shape in a temperature range of about −20° C. to about 50° C.

5. The system of claim 1, wherein the circuit board is made from fiber reinforced resins.

6. The system of claim 1, wherein the circuit board has a stiffness of at least three times the stiffness of a similar sized FR4 circuit board.

7. A stereo ranging system, comprising:
    a common substrate having a flat surface, the substrate including a stiffening material having substantially the same coefficient of thermal expansion as other materials in the common substrate;
    at least two semiconductor imagers secured to the flat surface of the common substrate and maintained at predefined locations relative to the flat surface; and
    a rail system comprising at least one rail, the rail system configured to receive at least two edges of the common substrate and enable expansion in length and width directions while maintaining the common substrate above a mounting structure to which the rail system is configured to secure.

8. The system of claim 7, wherein the rail system comprises at least two rails, each rail defining a channel that receives the edges of the common substrate.

9. The system of claim 7, wherein the rail system comprises fasteners configured to secure the at least one rail to the mounting structure.

10. The system of claim 7, wherein the common substrate includes at least one opening configured to receive a pin extending from the mounting service, to assist in maintaining the common substrate within the at least two rails.

11. The system of claim 7, wherein the common substrate is a multilayered circuit board that includes at least two layers having a thickness of at least $1/16"$.

12. The system of claim 1, wherein the printed circuit board is a single layer circuit board having a thickness of at least $1/8"$.

* * * * *